P. WEST & G. S. LEE.

Boots.

No. 5,670. Reissued Nov. 25, 1873.

WITNESSES.
Thos. H. Dodge
E. E. Moore

Rosburg West
George S. Lee } INVENTORS.

AM. PHOTO-LITHOGRAPHIC Co. N.Y. (OSBORNE'S PROCESS)

UNITED STATES PATENT OFFICE.

PRESBURY WEST AND GEORGE S. LEE, OF WORCESTER, MASSACHUSETTS.

IMPROVEMENT IN BOOTS.

Specification forming part of Letters Patent No. 142,424, dated September 2, 1873; reissue No. 5,670, dated November 25, 1873; application filed October 31, 1873.

*To all whom it may concern:*

Be it known that we, PRESBURY WEST and GEORGE S. LEE, both of the city and county of Worcester and Commonwealth of Massachusetts, have made certain new and useful Improvements in Boots; and we do hereby declare the following to be a full, clear, and exact description of the same, reference being had to the accompanying drawings, forming part of this specification, and in which—

Figure 1:
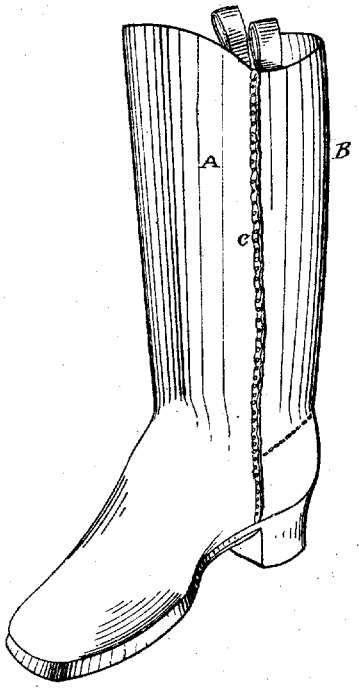
Figure 2:
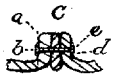

Figure 1 represents a perspective view of our improved boot, and Fig. 2 represents a transverse section through one of the seams.

The object of our invention is to provide a boot with its seams closed on the outer side, which boot shall possess all the advantages heretofore obtained in outer-seamed boots, together with greater strength and durability, while the defects or disadvantages incident to such boots are obviated, and the stay or brace heretofore used for covering the seam dispensed with, thus saving the cost of material and labor in attaching said brace or stay, and rendering the boot more serviceable and of neater appearance.

In outer-seamed boots there are no ridges or projections on the interior of the boot to gall the ankles or feet; consequently they are much more comfortable and easy to the wearer than those with seams on the inside, and, as the legs do not require to be turned after closing, the leather is not weakened or partially cracked off in the process of manufacture; but in outer-seamed boots, as heretofore made, a serious disadvantage or defect has been found in the fact that the action of water disintegrates and removes the wax from the thread where the seams are exposed on the outer side of the boot, and causes the thread to rot, thus weakening the stitches, so that in a very short time the thread will not sustain the strain of the leather, and the seams break out or give way long before the leather of the boot is worn out.

In trying to obviate this defect, and to protect the thread from the action of water and from exterior wear, a brace or stay has heretofore been used stitched onto the boot so as to cover the seams. These braces, in a measure, protect the stitches, but do not strengthen the seam to any practical extent. The braces are also expensive, and tend to stiffen the seams, and cause them to look cumbersome, while the stitches that hold the braces to the boot are subject to the same weakening causes as would be the stitches in the main seam were the braces not used. Therefore the braces themselves very often rip off, exposing the main seam.

It will readily be seen that to obviate the above defects, and to render the outside seams strong, permanent, and of good appearance, is a great and desirable improvement; and, to accomplish this result, our invention consists in a boot the seams of which are closed on the outer side, the parts being secured together by means of metal fastenings, as herein set forth.

In the drawings, A denotes the front, and B the back, of the boot-leg, said parts being united by means of seams C, closed upon the outside of the leg, and formed by means of metal fastenings $a'$. The metal fastenings in this instance are provided with heads $b$, their points being passed through the edges of the leather, and riveted down, as shown at $d$, after collars $e$ have been placed upon their ends.

Other forms of metal fastenings may be substituted in lieu of the particular style shown in the drawings, provided they are suitable to form a neat, tight, and flexible seam, and any suitable kind of metal may be used for a fastening.

We consider a brass fastening to be the best, as brass will not rust; but iron may be used if properly galvanized or tinned to prevent its rusting.

When the seams are closed, the outer edges of the leather can be shaved off and rubbed down, or otherwise finished.

By our present invention a boot is produced having much neater, stronger, and more durable outside seams than any made with thread, thereby obviating the defects of the outside seam, as heretofore made, and dispensing with the expensive covering, stay, or brace necessary to protect the stitches when thread is used.

It will thus be seen that, while all the great advantages of an outer-seamed boot are retained, the principal defects heretofore incident to such boots are overcome or obviated, and those skilled in the art to which our invention belongs will readily appreciate the practical value and merits of our invention.

Having described our improvement in boots, what we claim therein as new and of our invention, and desire to secure by Letters Patent as an improved article of manufacture, is—

A boot the seams of which are closed upon the outer side and formed by means of metal fastenings, for the purpose set forth.

PRESBURY WEST.
GEORGE S. LEE.

Witnesses:
CHAS. H. BURLEIGH,
M. F. HAMMOND.